(12) United States Patent
Jeong

(10) Patent No.: US 11,085,363 B2
(45) Date of Patent: Aug. 10, 2021

(54) INTERCOOLER DRAIN SYSTEM

(71) Applicants: Hyundai Motor Company, Seoul (KR); Kia Motors Corporation, Seoul (KR)

(72) Inventor: Seong Bin Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 49 days.

(21) Appl. No.: 16/687,888

(22) Filed: Nov. 19, 2019

(65) Prior Publication Data
US 2020/0408137 A1    Dec. 31, 2020

(30) Foreign Application Priority Data

Jun. 26, 2019 (KR) ........................ 10-2019-0076420

(51) Int. Cl.
*F02B 29/04* (2006.01)
*F02B 39/14* (2006.01)

(52) U.S. Cl.
CPC ...... *F02B 29/0468* (2013.01); *F02B 29/0406* (2013.01); *F02B 39/14* (2013.01)

(58) Field of Classification Search
CPC .. F02B 29/0468; F02B 29/0406; F02B 39/14; F28B 3/00; F28B 9/00; F28F 17/005; F28F 2265/06; F16K 15/028; F16K 31/18; F16K 33/00; F16K 24/046; Y10T 137/3068; Y10T 137/3071; Y10T 137/3074; Y10T 137/0379; Y10T 137/3003; Y10T 137/0874; F16T 1/20; F16T 1/22; F16T 1/26

USPC ........ 60/599; 165/111, 71; 137/42, 41, 192, 137/193, 194, 171, 177, 183, 187; 95/165, 166, 169; 96/292, 294, 300; 220/203.2, 203.21
See application file for complete search history.

(56) References Cited

U.S. PATENT DOCUMENTS

| | | | | |
|---|---|---|---|---|
| 4,158,387 | A * | 6/1979 | McDonald | F22B 37/483 165/71 |
| 4,856,550 | A * | 8/1989 | Smelcer | F16T 1/22 137/192 |
| 5,275,233 | A * | 1/1994 | Little | F28D 9/0068 165/111 |

(Continued)

FOREIGN PATENT DOCUMENTS

| | | | | |
|---|---|---|---|---|
| EP | 3502434 A1 * | 6/2019 | .......... | F02B 29/0468 |
| FR | 2959455 A1 * | 11/2011 | .......... | F02B 29/0468 |

(Continued)

*Primary Examiner* — Thai Ba Trieu
(74) *Attorney, Agent, or Firm* — Mintz Levin Cohn Ferris Glovsky and Popeo, P.C.; Peter F. Corless

(57) ABSTRACT

An intercooler drain system which drains condensate from an intercooler includes an upper header, a lower header, and a plurality of tubes connecting the upper header and the lower header, the intercooler drain system including: a drain passage allowing the condensate collected in the lower header of the intercooler to be drained; and a valve opening and closing the drain passage. The valve has a specific gravity less than a specific gravity of the condensate, and when the condensate is collected above a predetermined level in the lower header, the valve rises due to buoyancy to open the drain passage.

10 Claims, 11 Drawing Sheets

(56) References Cited

U.S. PATENT DOCUMENTS

| | | | | |
|---|---|---|---|---|
| 6,301,887 B1* | 10/2001 | Gorel | .................. | F02B 29/0468 |
| | | | | 60/599 |
| 7,654,397 B2* | 2/2010 | Allouche | ........... | B01D 21/2444 |
| | | | | 96/157 |
| 8,376,029 B2* | 2/2013 | Rericha | .................. | F28D 1/022 |
| | | | | 165/44 |
| 9,140,178 B2* | 9/2015 | Pursifull | ............. | F02B 29/0468 |
| 9,181,853 B2* | 11/2015 | Leone | .................. | F02B 29/0468 |
| 9,776,474 B2* | 10/2017 | Kume | .................. | F24F 13/222 |
| 10,100,715 B2* | 10/2018 | Dieterle | .............. | F02B 29/0468 |
| 10,781,742 B2* | 9/2020 | Goncalves | .......... | F02B 29/0468 |
| 2008/0302327 A1* | 12/2008 | Dahl | .................. | F02B 29/0468 |
| | | | | 123/184.53 |
| 2009/0031999 A1* | 2/2009 | Erickson | ............. | F02B 29/0443 |
| | | | | 123/563 |
| 2011/0107760 A1* | 5/2011 | Quinn | ................. | F02B 29/0468 |
| | | | | 60/599 |
| 2015/0167539 A1* | 6/2015 | Basile | ................. | F02B 29/0468 |
| | | | | 60/599 |
| 2015/0285128 A1* | 10/2015 | Cardwell | ............. | F28F 17/005 |
| | | | | 60/599 |
| 2016/0186781 A1* | 6/2016 | Borkowski | ......... | F04D 29/5826 |
| | | | | 415/1 |
| 2017/0299269 A1* | 10/2017 | Ausman | ................ | F28D 1/0226 |
| 2018/0135925 A1* | 5/2018 | Tang | ................... | F02B 29/0468 |
| 2018/0283307 A1* | 10/2018 | Dudar | .................. | F02D 41/222 |
| 2018/0335261 A1* | 11/2018 | Shea | .................... | F28D 7/1607 |
| 2020/0191047 A1* | 6/2020 | Goncalves | .......... | F02B 29/0468 |
| 2020/0279662 A1* | 9/2020 | Marquino | ................ | F28B 9/00 |

FOREIGN PATENT DOCUMENTS

| | | | | |
|---|---|---|---|---|
| JP | 01232184 A | * | 9/1989 | ............. F04B 39/16 |
| JP | 10184471 A | * | 7/1998 | ................ F16T 1/22 |
| JP | 2002349273 A | * | 12/2002 | .......... F02B 29/0468 |

* cited by examiner

INTERCOOLER DRAIN SYSTEM

CROSS-REFERENCE TO RELATED APPLICATION

This application claims under 35 U.S.C. § 119(a) the benefit of Korean Patent Application No. 10-2019-0076420, filed on Jun. 26, 2019, in the Korean Intellectual Property Office, the disclosure of which is incorporated herein in its entirety by reference.

BACKGROUND

(a) Technical Field

The present disclosure relates to an intercooler drain system, more particularly, to the intercooler drain system which drains condensate from an intercooler.

(b) Description of the Related Art

An engine of a vehicle generates power by mixing air introduced from the outside with fuel at an appropriate ratio and combusting the air-fuel mixture. After combustion for power generation of the engine, exhaust gases are generated, and these exhaust gases are discharged to the outside.

In the process of generating power by driving the engine, it is necessary to supply enough outside air for combustion to obtain a desired power output and combustion efficiency. To this end, a turbocharger is used as a device for charging combustion air to improve the combustion efficiency of the engine.

Typically, a turbocharger includes a turbine driven by the exhaust gas discharged from the engine, and a compressor connected to the turbine by a common shaft. As the compressor compresses air, the compressed air is supplied to a cylinder of the engine, and the engine output and efficiency are increased. Turbochargers are applied to most diesel engines, and in some cases, to gasoline engines.

Since the air compressed by the compressor of the turbocharger is expanded as its temperature is increased, oxygen density in the air decreases, which reduces the charging efficiency of air drawn into the cylinder of the engine. An intercooler (or charge air cooler) is configured to cool the high-temperature air compressed by the compressor of the turbocharger and increase the air density. As a result, air intake efficiency into the cylinder of the engine is increased, which improves the engine's combustion efficiency and fuel efficiency, and reduces carbon dioxide emissions.

When the high-temperature air compressed by the compressor of the turbocharger is cooled by heat exchange in the intercooler, condensate (condensed water) is produced as the water vapor contained in the air condenses. The condensate, which is accumulated in a lower portion of the intercooler, is frozen at an outside air temperature of 0° C. in the winter. As a result, an air passage may be partially or totally blocked, which can prevent the intake of air and thus make the engine very difficult to start.

The above information described in this background section is provided to assist in understanding the background of the inventive concept, and may include any technical concept which is not considered as the prior art that is already known to those skilled in the art.

SUMMARY

An aspect of the present disclosure provides an intercooler drain system which immediately drains condensate produced in an intercooler.

According to an aspect of the present disclosure, an intercooler drain system, which drains condensate from an intercooler including an upper header, a lower header, and a plurality of tubes connecting the upper header and the lower header, may include: a drain passage allowing the condensate collected in the lower header of the intercooler to be drained; and a valve opening and closing the drain passage, wherein the valve may have a specific gravity less than a specific gravity of the condensate, and when the condensate is collected above a predetermined level in the lower header, the valve may rise due to buoyancy to open the drain passage.

The drain passage may include a first passage directly communicating with a lower cavity of the lower header, a second passage downwardly connected to the first passage, and a valve seat disposed between the first passage and the second passage, and a diameter of the first passage may be greater than a diameter of the second passage.

The lower header may have the lower cavity and a lower air passage communicating with the lower cavity, and a lower edge of the lower air passage may be located higher than a bottom of the lower cavity.

The first passage may be located below the lower cavity, and the specific gravity of the valve may be determined such that the predetermined level may be located lower than the lower edge of the lower air passage.

A lower mount may protrude downwardly from a bottom surface of the lower header, and the drain passage may be provided in the lower mount.

The specific gravity of the valve may be greater than a specific gravity of an oil.

The intercooler drain system may further include a drain cap fitted to a top end of the first passage, and the drain cap may be located above the valve.

The drain passage may be connected to a water tank of a water injection system through a recovery line.

The intercooler drain system may further include an oil separator disposed between the drain passage and the water tank.

The oil separator may include a housing having a separation space and an oil collection space divided by a partition, and a plurality of egg-shaped plates stacked vertically within the separation space of the housing to separate an oil from the condensate, and the plurality of egg-shaped plates may separate the oil from the condensate due to a difference in specific gravity between the oil and the condensate.

An uppermost egg-shaped plate among the plurality of egg-shaped plates may be located higher than a top end of the partition.

Each egg-shaped plate may have a plurality of ridge portions and a plurality of valley portions, and each ridge portion may have a through hole.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
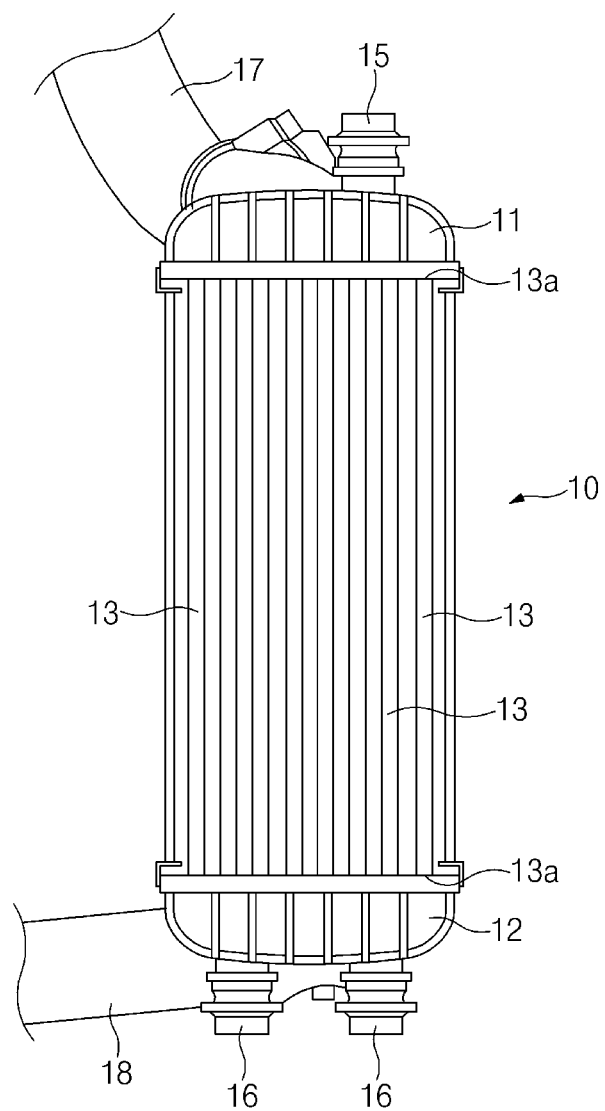
FIG. 1 illustrates an intercooler according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

An intercooler 10 for a vehicle may be mounted on an intake line between a downstream portion of a compressor and an intake manifold, and be configured to cool high-temperature air compressed by the compressor of a turbocharger so as to increase charging efficiency of air supplied to a cylinder.

Referring to FIG. 1, the intercooler 10 may include an upper header 11, a lower header 12, and a plurality of tubes 13 connecting the upper header 11 and the lower header 12.

The upper header 11 may be configured to receive air, which is compressed by the compressor of the turbocharger, through an upper intake pipe 17. The upper header 11 may have an upper mount 15.

The lower header 12 may be configured to discharge the compressed air to the cylinder of the engine through a lower intake pipe 18. Referring to FIG. 1, the lower header 12 may be disposed below the upper header 11 to be spaced apart from the upper header 11. The lower header 12 may have a lower mount 16.

The plurality of tubes 13 may extend to connect the upper header 11 and the lower header 12. The plurality of tubes 13 may be arranged to be parallel to each other. An internal passage (not shown) through which the compressed air flows may be formed in each tube 13. Adjacent tubes 13 may be spaced apart from each other to form a cooling passage through which vehicle-induced wind (driving wind) or cooling air produced by a cooling fan or the like passes. Each tube 13 may have an inlet 13a through which the compressed air is introduced, and an outlet 13b through which the compressed air is discharged. The inlet 13a of the tube 13 may communicate with the upper header 11, and the outlet 13b of the tube 13 may communicate with the lower header 12. A cooling fin (not shown) may be disposed in the internal passage and/or the cooling passage of the tube 13.

An intercooler drain system 20, according to an exemplary embodiment of the present disclosure, may include a drain passage 30 allowing condensate (condensed water)

collected in the lower header 12 to be drained, and a valve 34 opening and closing the drain passage 30.

Figure 2:
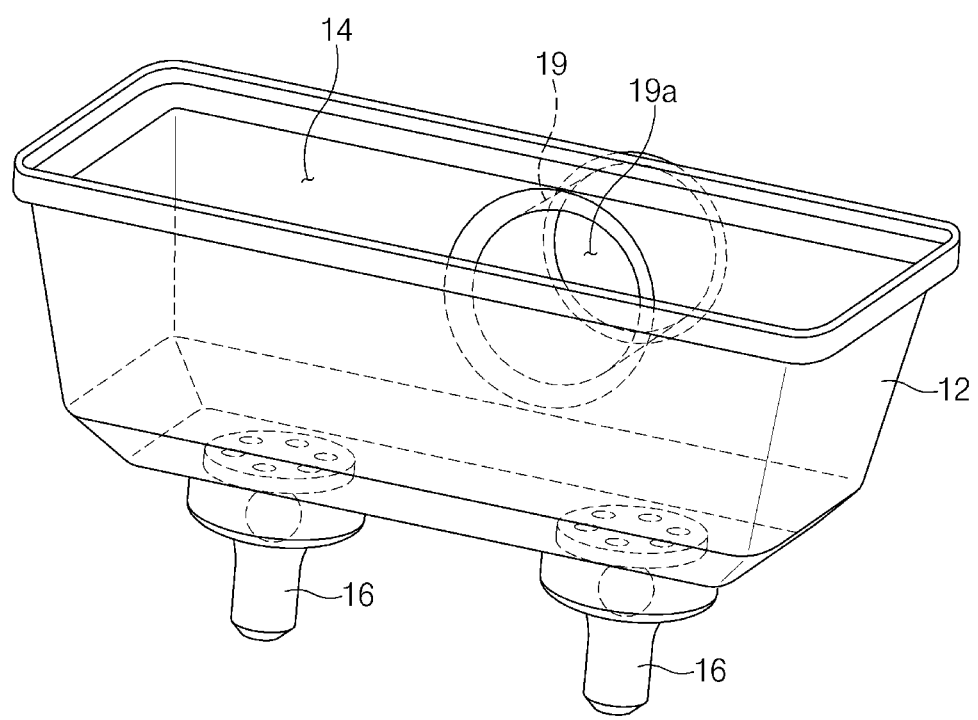
FIG. 2 illustrates a perspective view of a lower header of an intercooler.
Figure 3:
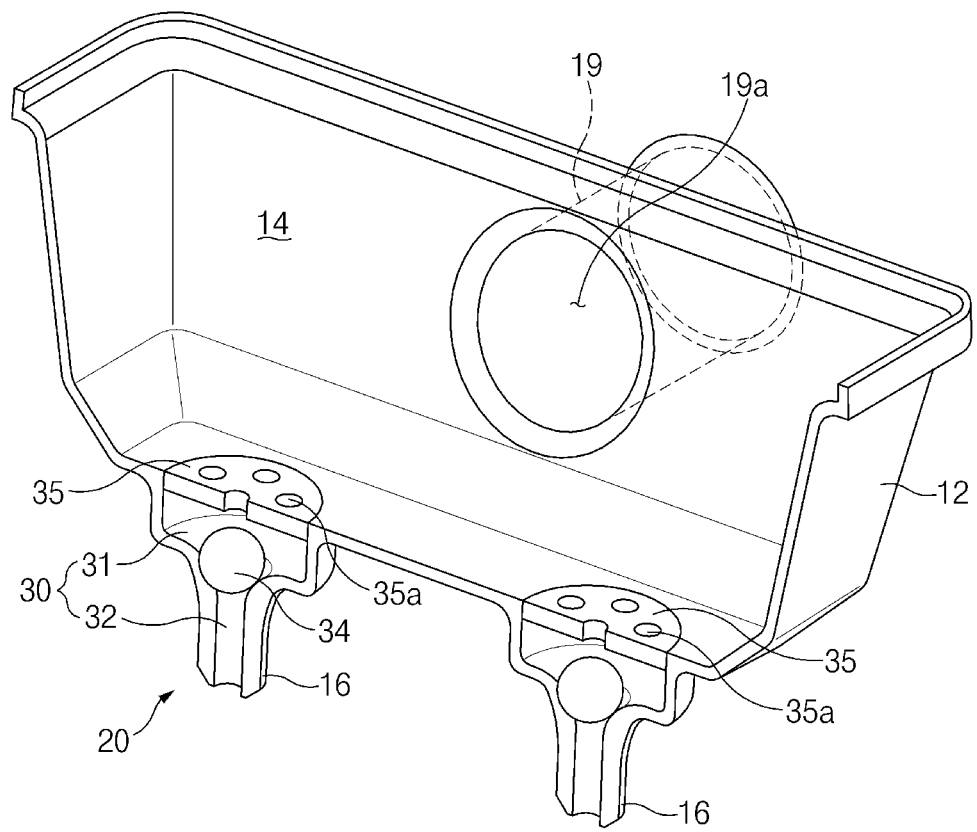
FIG. 3 illustrates a cut-away perspective view of the lower header of FIG. 2.
Figure 4:
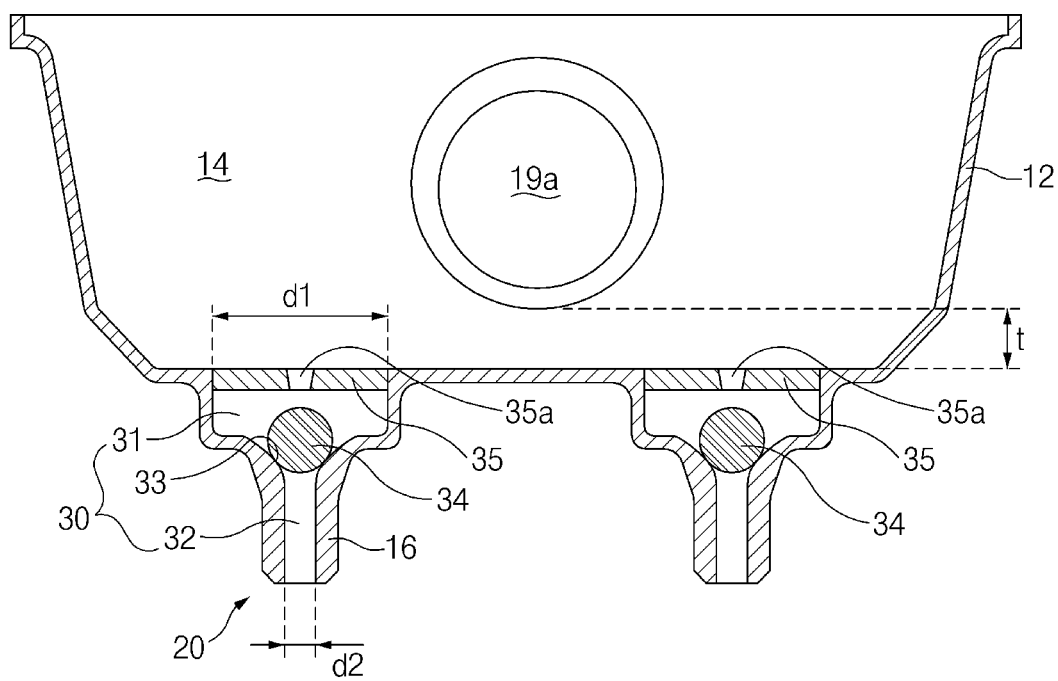
FIG. 4 illustrates an intercooler drain system according to an exemplary embodiment of the present disclosure.

Referring to FIGS. 2 to 4, the lower header 12 may have a lower cavity 14. The lower cavity 14 may receive the compressed air which is cooled by the cooling air. The lower header 12 may have a nipple 19 to which the lower intake pipe 18 is sealingly connected. The nipple 19 may have a lower air passage 19a communicating with the lower cavity 14, and the lower intake pipe 18 may be directly connected to the nipple 19. The compressed air received in the lower cavity 14 may be discharged to the lower intake pipe 18 through the lower air passage 19a.

According to an exemplary embodiment, a lower edge of the lower air passage 19a may be located higher than the bottom of the lower header 12 by a predetermined height t. Thus, the inflow of the condensate or frozen condensate to the lower air passage 19a may be minimized.

The lower mount 16 may protrude downwardly from a bottom surface of the lower header 12. The lower mount 16 may be mounted on a frame of a vehicle body, other components, or the like.

The drain passage 30 may be located below the lower header 12, and be connected to the bottom of the lower cavity 14 of the lower header 12. In particular, the drain passage 30 may be formed inside the lower mount 16. The drain passage 30 may include a first passage 31 directly communicating with the lower cavity 14, a second passage 32 downwardly connected to the first passage 31, and a valve seat 33 disposed between the first passage 31 and the second passage 32. The first passage 31 may be located below the lower cavity 14, and be connected to the bottom of the lower cavity 14. The first passage 31 may have a first diameter d1, and the second passage 32 may have a second diameter d2. The first diameter d1 may be greater than the second diameter d2. The valve seat 33 may have a curved tapered shape to tightly contact the valve 34.

The valve 34 may have a spherical shape. When the condensate is not collected above a predetermined level h, the valve 34 may be seated on the valve seat 33 of the drain passage 30. A diameter of the valve 34 may be less than the first diameter d1 of the first passage 31, and be greater than the second diameter d2 of the second passage 32.

Figure 5:
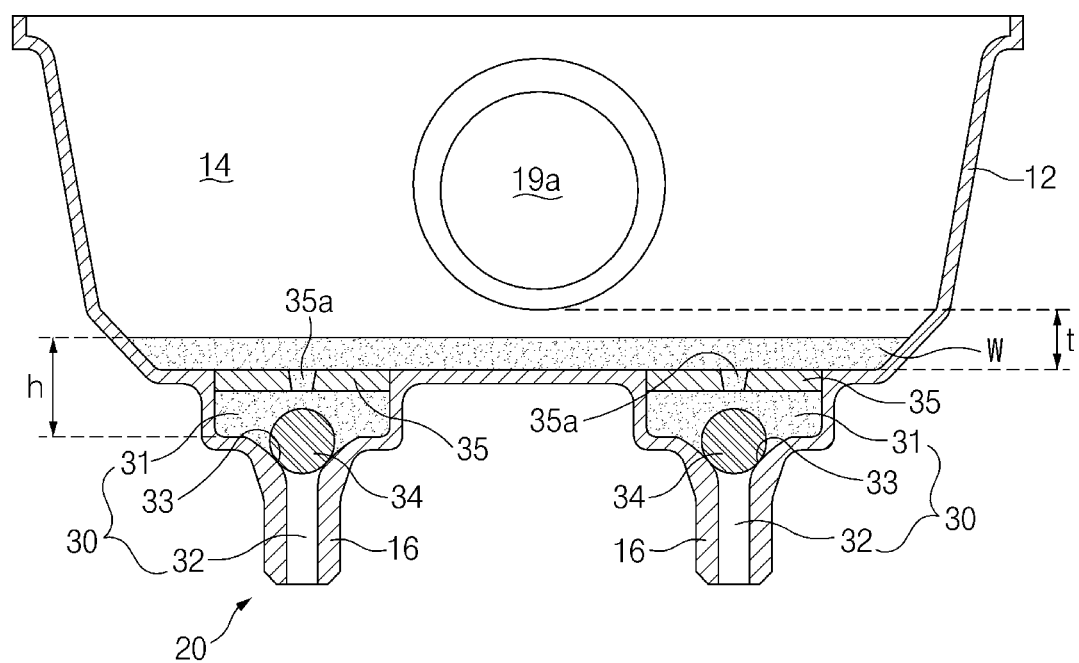
FIG. 5 illustrates a state in which condensate is collected in a lower cavity of a lower header and a drain passage of an intercooler drain system according to an exemplary embodiment of the present disclosure.
Figure 6:
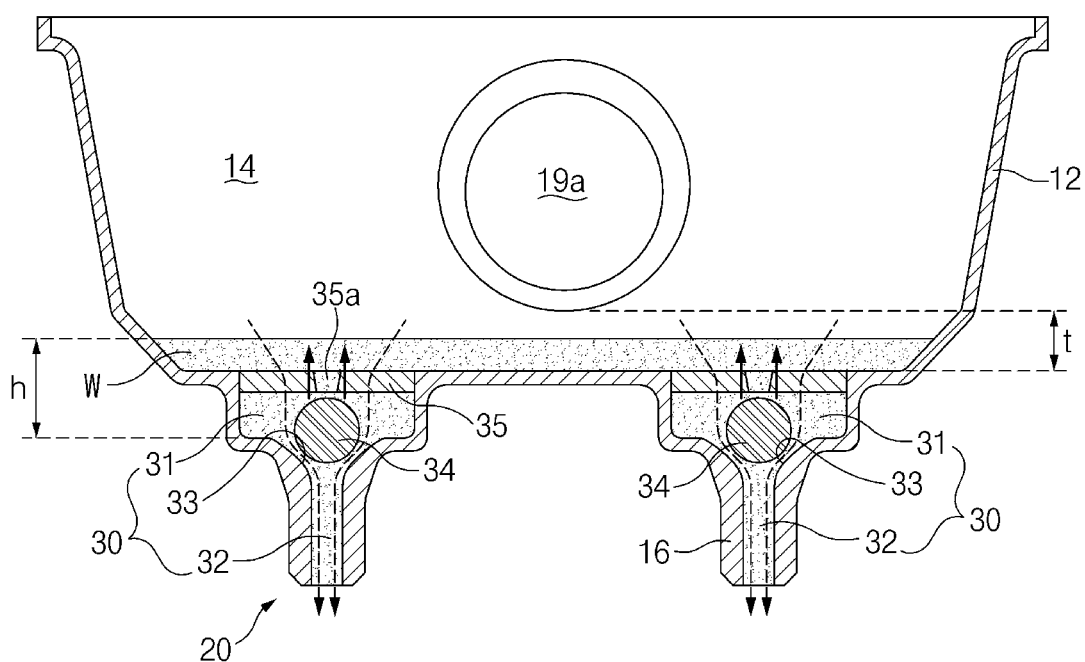
FIG. 6 illustrates a state in which a drain passage is opened as a valve rises due to buoyancy in an intercooler drain system according to an exemplary embodiment of the present disclosure.

The valve 34 may have a specific gravity $S_{ball}$ less than a specific gravity $S_{water}$ of the condensate W ($S_{ball} < S_{water}$). When the condensate W is collected above the predetermined level h in the lower cavity 14 of the lower header 12 and the first passage 31 (see FIG. 5), the valve 34 may rise from the valve seat 33 due to buoyancy caused by a difference in specific gravity between the valve 34 and the condensate W so that the valve 34 may be moved away from the valve seat 33 (see FIG. 6). As the second passage 32 is opened, the condensate collected in the first passage 31 may be drained. Here, the predetermined level h may be a level at which the valve 34 rises from the valve seat 33 due to buoyancy, and the predetermined level h may depend on the specific gravity $S_{ball}$ of the valve 34. In particular, the specific gravity $S_{ball}$ of the valve 34 may be determined such that the predetermined level h may be located lower than the lower edge of the lower air passage 19a.

As the drain passage 30 is connected to the bottom of the lower cavity 14 of the lower header 12, and the valve 34 is able to open and close the drain passage 30 due to the difference in specific gravity between the valve 34 and the condensate W, a condensate drain structure may be significantly simplified, and the manufacturing cost thereof may be significantly reduced. In addition, when the condensate is collected above the predetermined level h, the valve 34 may immediately open the drain passage 30 so that the condensate may be discharged at all times regardless of a turn-on or turn-off state of a start switch. Thus, a start failure problem due to freezing of the condensate may be overcome.

Figure 7:
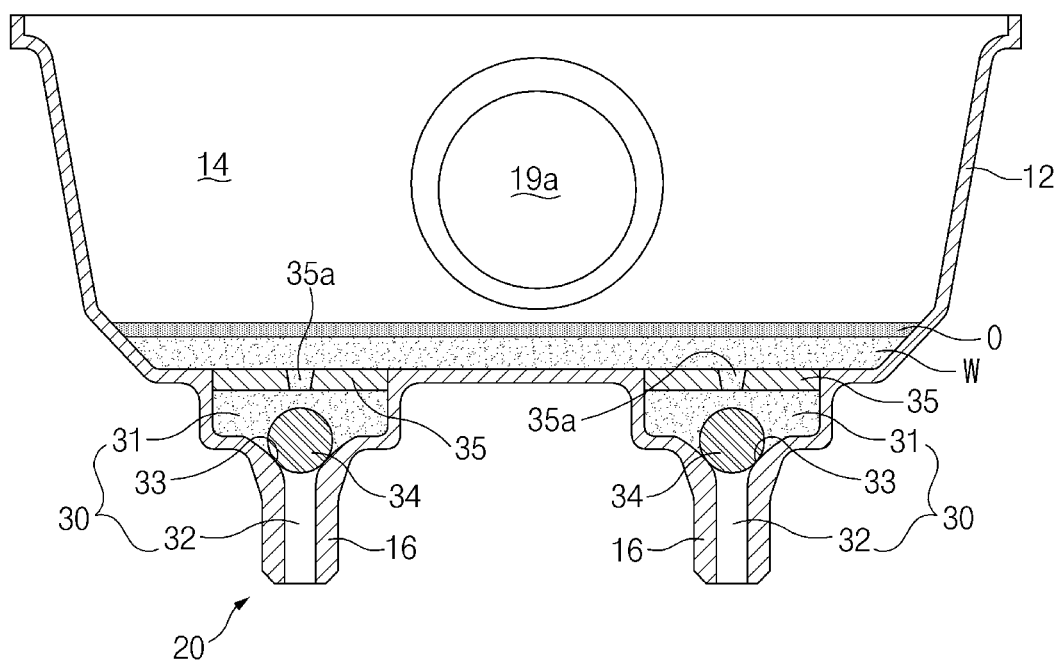
FIG. 7 illustrates a state in which condensate and oil are collected in a lower cavity of a lower header and a drain passage of an intercooler drain system according to an exemplary embodiment of the present disclosure.

In particular, the specific gravity $S_{ball}$ of the valve 34 may be less than the specific gravity $S_{water}$ of the condensate, and be greater than a specific gravity $S_{oil}$ of an oil component such as an engine oil ($S_{oil} < S_{ball} < S_{water}$). Even though the oil component such as the engine oil is collected in the lower cavity 14 of the lower header 12 and the first passage 31, the valve 34 may not rise from the valve seat 33 because the specific gravity $S_{ball}$ of the valve 34 is greater than the specific gravity $S_{oil}$ of the oil O, and thus the oil component may not be drained. Referring to FIG. 7, when the condensate W and the oil O are mixed, the oil O may float on the condensate W because the specific gravity $S_{water}$ of the condensate W is greater than the specific gravity $S_{oil}$ of the oil O. When the condensate W is collected above the predetermined level h, the valve 34 may rise from the valve seat 33 because the specific gravity $S_{ball}$ of the valve 34 is less than the specific gravity $S_{water}$ of the condensate W. As the valve 34 opens the second passage 32, the condensate W may be drained. When the oil O comes into contact with the valve 34 after the condensate is drained, the valve 34 may fall by its own weight and be seated on the valve seat 33, thereby closing the second passage 32. Thus, the oil O may be prevented from being discharged through the drain passage 30, and contamination due to the discharge of the oil may be minimized.

Meanwhile, in a state in which the condensate is collected in the first passage 31 at a relatively low level to the extent that the valve 34 does not rise from the valve seat 33 due to buoyancy (that is, in a state in which the condensate is collected at a lower level than the predetermined level h), the condensate may be frozen in the first passage 31 as the outside air temperature is below 0° C. and the start switch of the vehicle is turned off. However, as the lower edge of the lower air passage 19a is located higher than the bottom of the lower header 12, the frozen condensate may not block the lower air passage 19a so that it may not disturb the discharge of the compressed air through the lower air passage 19a. In addition, as the start switch of the vehicle is turned on, the temperature of the air compressed by the turbocharger may be increased to a maximum of 100° C., and thus the frozen condensate in the first passage 31 may be easily thawed.

A drain cap 35 may be mounted on a top end of the first passage 31, and the drain cap 35 may have a plurality of drain holes 35a. The drain cap 35 may be located above the valve 34, and the drain cap 35 may be mounted after the valve 34 is seated on the valve seat 33 so that the drain cap 35 may prevent the valve 34 from being moved out of the first passage 31 toward the lower cavity 14.

According to an exemplary embodiment, the drain cap 35 may be interference fit into the top end of the first passage 31. For example, an outer diameter of the drain cap 35 may be slightly greater than the diameter d1 of the first passage 31.

As the drain passage 30 is provided in the lower mount 16 of the lower header 12, the drain structure may be simplified, and the manufacturing cost may be reduced.

If the oil is contained in the condensate when the condensate is drained from the drain passage 30, this may violate environmental regulations. Thus, an oil separator, a filter, or the like may be mounted in the drain passage 30, thereby separating or filtering the oil from the condensate.

Figure 8:
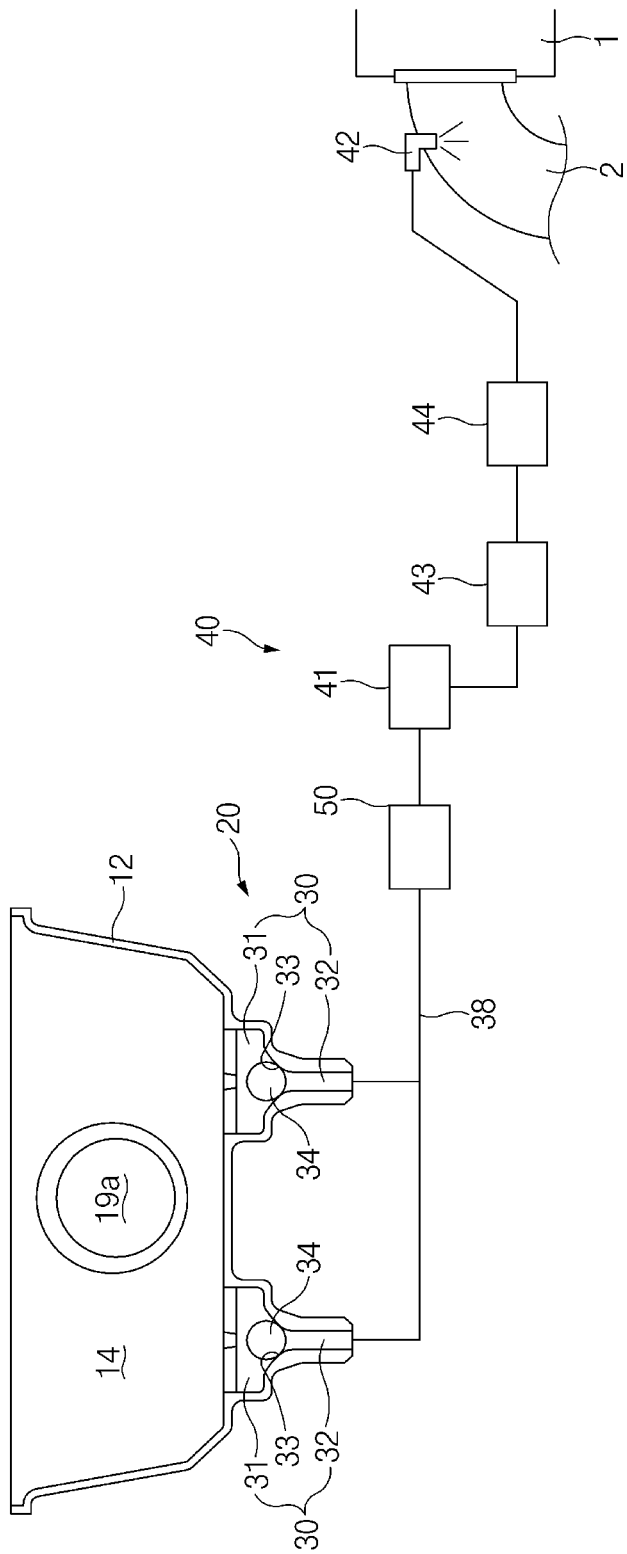
FIG. 8 illustrates a configuration in which a drain passage of an intercooler drain system according to an exemplary embodiment of the present disclosure is connected to a water tank of a water injection system through a condensate recovery line.

Referring to FIG. 8, as an alternative for preventing the oil from being discharged from the drain passage 30, the condensate drained from the drain passage 30 may be recovered to a water tank of another system. According to an exemplary embodiment, the drain passage 30 may be connected to a water tank 41 of a water injection system 40 through a recovery line 38 as illustrated in FIG. 8. For example, the water injection system 40 may include the water tank 41 in which water is stored, a water injector 42 injecting the water supplied from the water tank 41 into an intake system 2 or a cylinder of an engine 1, a water pump 43 pumping the water stored in the water tank 41 to the water injector 42, and a solenoid valve 44 disposed between the water pump 43 and the water injector 42.

The condensate drained from the drain passage 30 of the intercooler drain system 20 may flow into the water tank 41 through the recovery line 38, so that the condensate may be reused in the water injection system 40. Even through the oil component such as the engine oil is contained in the condensate, it may be injected into the intake system 2 or the cylinder of the engine 1 by the water injector 42 so that it may not violate the environmental regulations.

According to an exemplary embodiment, the water tank 41 of the water injection system 40 may be located lower than the drain passage 30 so that the condensate drained from the drain passage 30 may flow naturally into the water tank 41 due to a differential head without a pump.

According to an exemplary embodiment of the present disclosure, an oil separator 50 may be disposed on the condensate recovery line 38 between the drain passage 30 and the water tank 41. The oil separator 50 may separate the oil from the condensate drained from the drain passage 30, so that the flow of the oil from the drain passage 30 into the water tank 41 may be minimized.

As for the oil separator 50, oil separators of various structures such as a centrifuge and a one-way valve having a filter may be used. According to an exemplary embodiment of the present disclosure, the oil separator 50 may be an oil separator that separates oil by a specific gravity difference (buoyancy), such as an egg plate separator, a coalescing plate separator, and a corrugated plate separator, thereby minimizing the size or volume of the oil separator 50.

Figure 9:
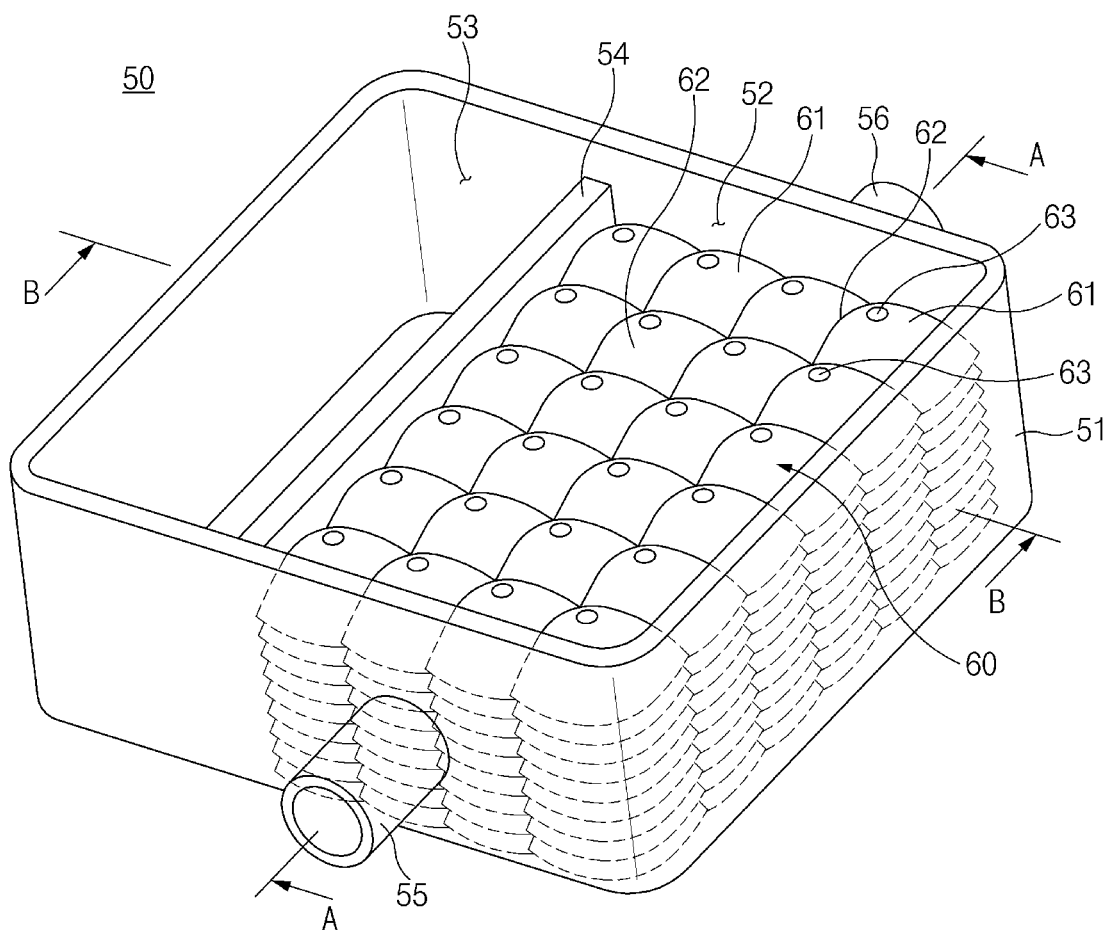
FIG. 9 illustrates a perspective view of an oil separator illustrated in FIG. 8.
Figure 10:
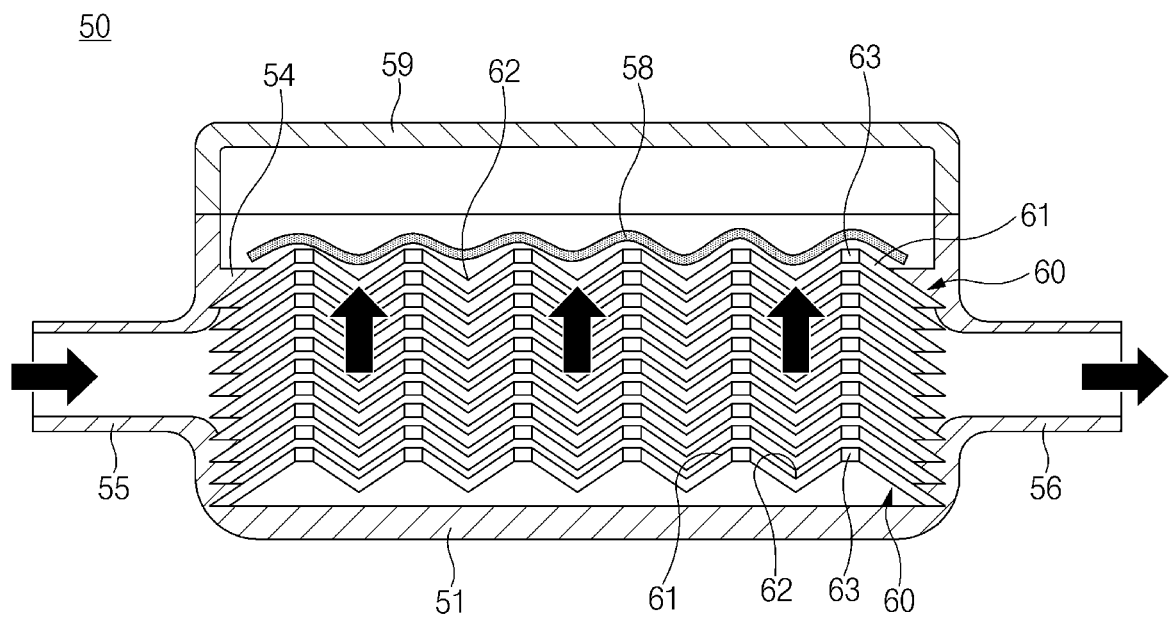
FIG. 10 illustrates a cross-sectional view taken along line A-A of FIG. 9.
Figure 11:
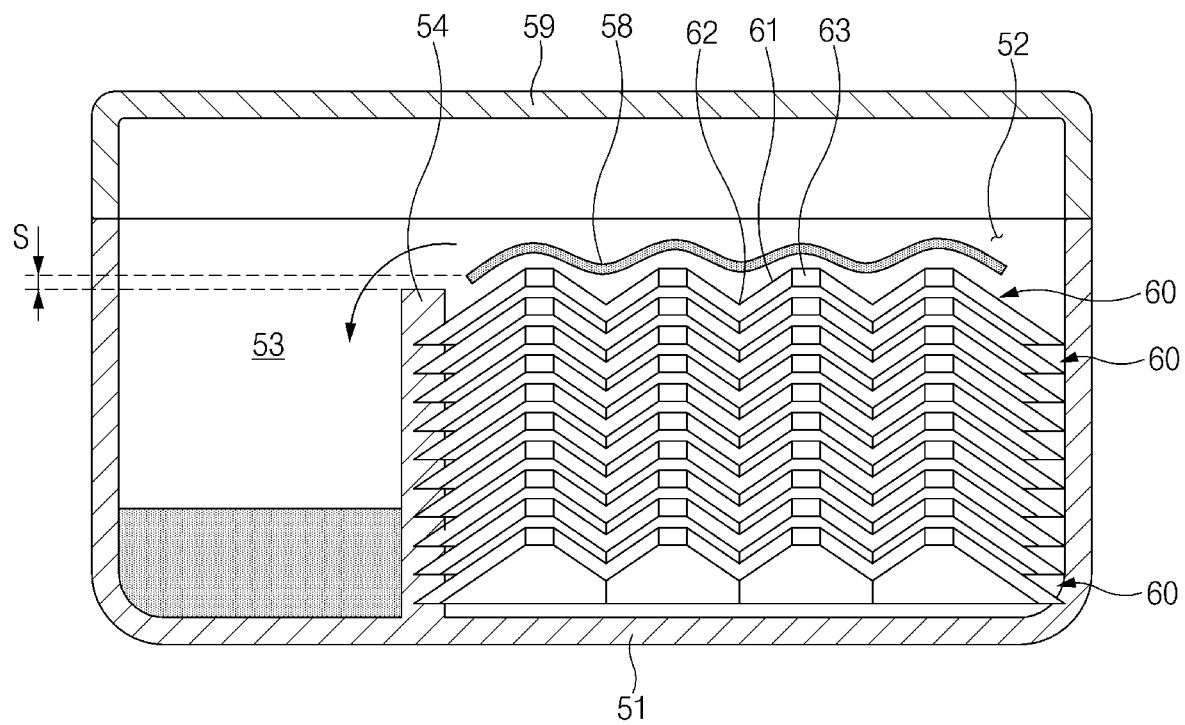
FIG. 11 illustrates a cross-sectional view taken along line B-B of FIG. 9.

Referring to FIGS. 9 to 11, the oil separator 50 may include a housing 51 having a separation space 52 and an oil collection space 53 divided by a partition 54, a plurality of egg-shaped plates 60 contained in the separation space 52 of the housing 51 to separate the oil from the condensate, and a cover 59 covering the housing 51.

The housing 51 may include the separation space 52 and the oil collection space 53 divided by the partition 54. The separation space 52 may accommodate the plurality of egg-shaped plates 60 which separate the oil contained in the condensate. The oil collection space 53 may receive and collect the oil which is separated from the condensate in the separation space 52. A top end of the partition 54 may be located lower than a top end of a sidewall of the housing 51.

The housing 51 may have an inlet port 55 and an outlet port 56 communicating with the separation space 52, and the inlet port 55 and the outlet port 56 may face each other.

The plurality of egg-shaped plates 60 may be stacked vertically within the separation space 52 of the housing 51, and adjacent egg-shaped plates 60 may be spaced apart from each other with a gap therebetween. The uppermost egg-shaped plate 60 among the plurality of vertically stacked egg-shaped plates 60 may be located higher than the top end of the partition 54 by a predetermined spacing S. Thus, the oil separated from the condensate in the separation space 52 may easily flow into the oil collection space 53.

Each egg-shaped plate 60 may have a plurality of ridge portions 61 and a plurality of valley portions 62. As illustrated in FIGS. 10 and 11, each ridge portion 61 may have a through hole 63. In addition, each valley portion 62 may have a through hole 63. The structure and material of the egg-shaped plates 60 may be varied by taking viscosity, dispersion efficiency, floating efficiency, and the like of the engine oil into consideration.

When the oil-containing condensate is introduced into the separation space 52 of the housing 51 through the inlet port 55, and flows through the gaps between the plurality of egg-shaped plates 60 at a constant flow rate, the oil rises to the top of the separation space 52 through the through holes 63 of each egg-shaped plate 60 due to the buoyancy caused by the specific gravity difference between the oil and the condensate. That is, the plurality of egg-shaped plates 60 may separate the oil from the condensate by allowing the oil and contaminants similar to the specific gravity of the oil to float according to the stroke's law. Thus, a floating oil layer 58 may be primarily collected on a top surface of the uppermost egg-shaped plate 60, and be secondarily collected in the oil collection space 54 through the partition 54. Solids heavier than the condensate may sink to the bottom of the separation space 52, and the condensate, from which the oil has been separated, may be discharged through the outlet port 56.

As set forth above, according to exemplary embodiments of the present disclosure, as the drain passage is located below the lower header and is connected to the bottom of the lower cavity of the lower header, and the valve is able to open and close the drain passage due to the difference in specific gravity between the valve and the condensate, the condensate drain structure may be significantly simplified, and the manufacturing cost thereof may be significantly reduced. In addition, when the condensate is collected above a predetermined level, the valve may immediately open the drain passage so that the condensate may be discharged at all times regardless of the turn-on or turn-off state of the start switch. Thus, a start failure problem due to freezing of the condensate may be overcome.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An intercooler drain system which drains condensate from an intercooler including an upper header, a lower header, and a plurality of tubes connecting the upper header and the lower header, the intercooler drain system comprising:

a drain passage allowing the condensate collected in the lower header of the intercooler to be drained; and a valve opening and closing the drain passage, wherein the valve has a specific gravity less than a specific gravity of the condensate, when the condensate is collected above a predetermined level in the lower header, the valve rises due to buoyancy to open the drain passage, wherein the lower header has the lower cavity and a lower air passage communicating with the lower cavity, wherein a lower edge of the lower air passage is located higher than a bottom of the lower cavity, where in the first passage is located below the lower cavity, and wherein the specific gravity of the valve is determined such that the predetermined level is located lower than the lower edge of the lower air passage.

2. The intercooler drain system according to claim 1, wherein the drain passage includes a first passage directly communicating with a lower cavity of the lower header, a second passage downwardly connected to the first passage, and a valve seat disposed between the first passage and the second passage, and a diameter of the first passage is greater than a diameter of the second passage.

3. The intercooler drain system according to claim 2, further comprising a drain cap fitted to a top end of the first passage, wherein the drain cap is located above the valve.

4. The intercooler drain system according to claim 1, wherein:

a lower mount protrudes downwardly from a bottom surface of the lower header, and the drain passage is provided in the lower mount.

5. The intercooler drain system according to claim 1, wherein the specific gravity of the valve is greater than a specific gravity of an oil.

6. The intercooler drain system according to claim 1, wherein the drain passage is connected to a water tank of a water injection system through a recovery line.

7. The intercooler drain system according to claim 6, further comprising an oil separator disposed between the drain passage and the water tank.

8. The intercooler drain system according to claim 7, wherein:

the oil separator includes a housing having a separation space and an oil collection space divided by a partition, and a plurality of egg-shaped plates stacked vertically within the separation space of the housing to separate an oil from the condensate, and the plurality of egg-shaped plates separate the oil from the condensate due to a difference in specific gravity between the oil and the condensate.

9. The intercooler drain system according to claim 8, wherein an uppermost egg-shaped plate among the plurality of egg-shaped plates is located higher than a top end of the partition.

10. The intercooler drain system according to claim 9, wherein:

each egg-shaped plate has a plurality of ridge portions and a plurality of valley portions, and each of the ridge portions has a through hole.

* * * * *